Patented Feb. 18, 1947

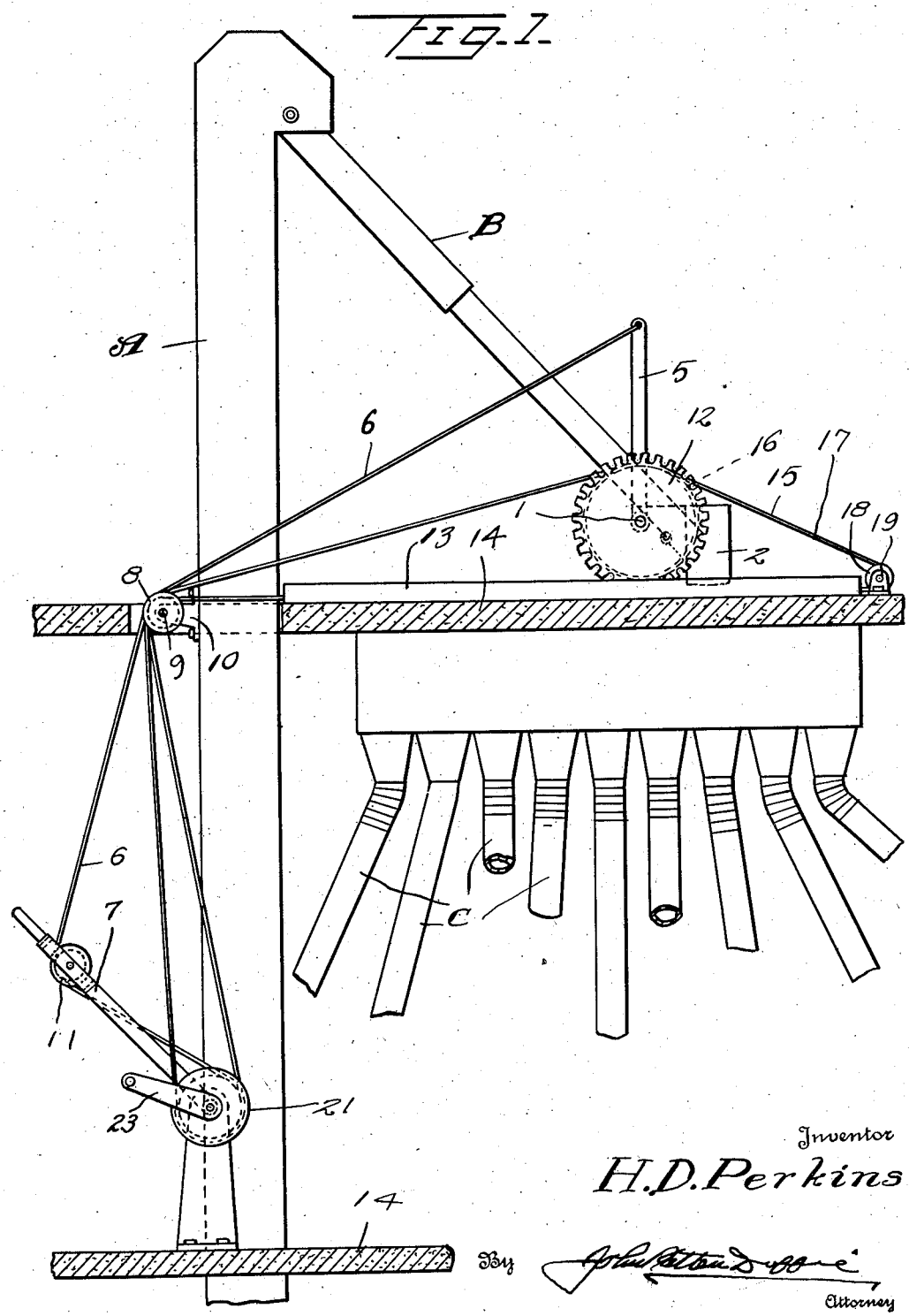

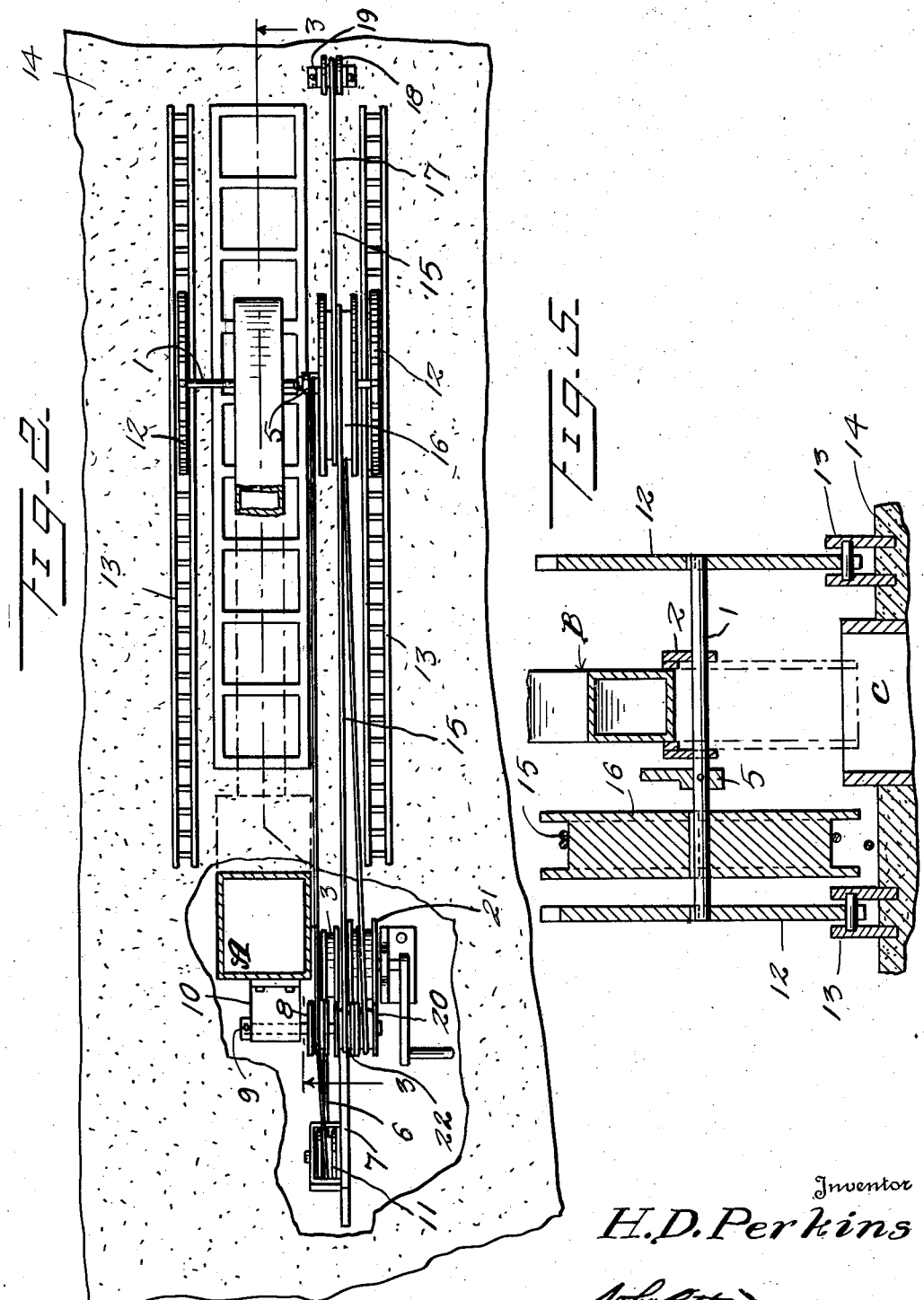

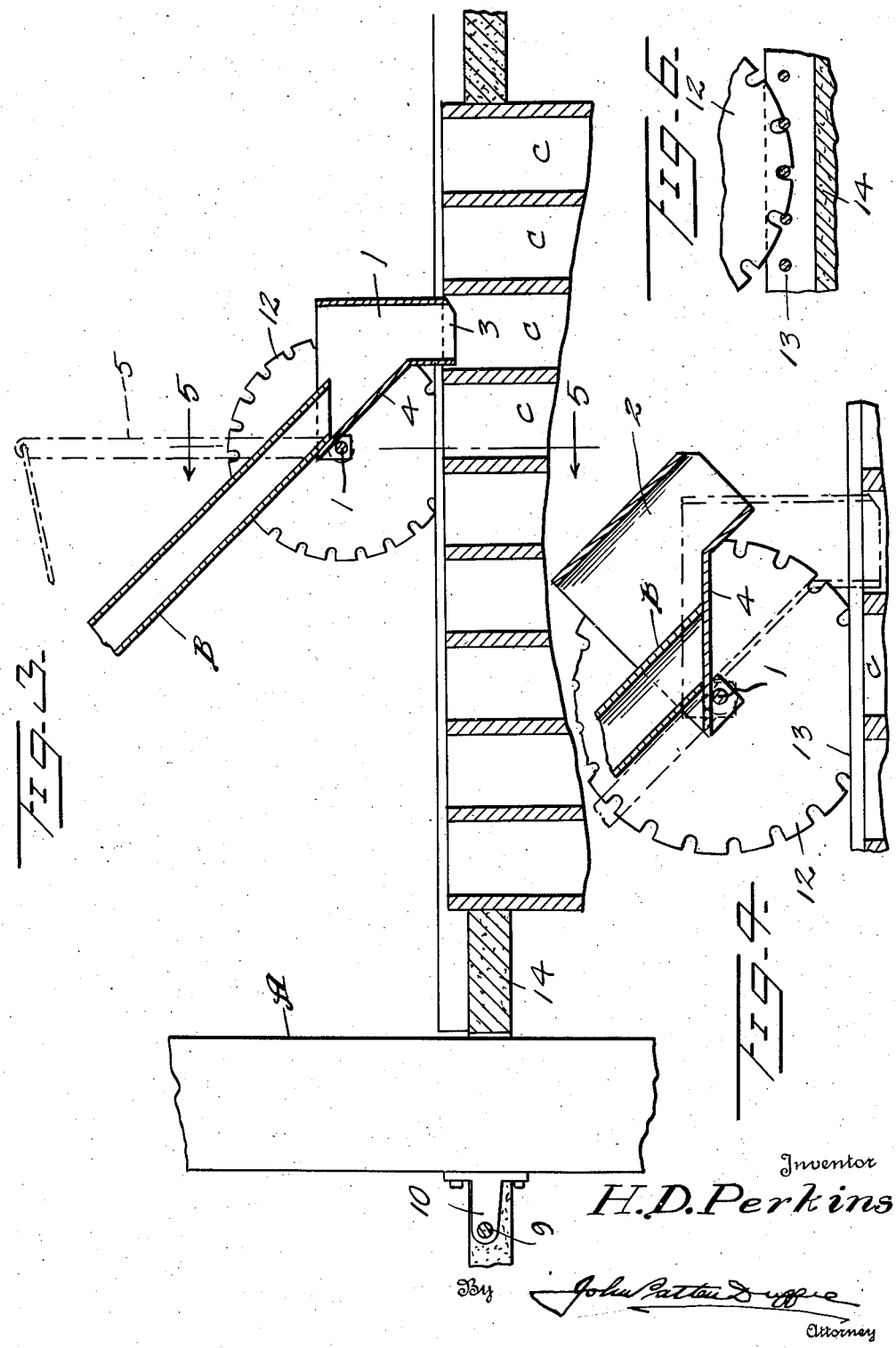

2,416,065

UNITED STATES PATENT OFFICE 2,416,065

DISTRIBUTING SPOUT FOR GRAIN ELEVATORS

Horace D. Perkins, Fargo, N. Dak.

Application October 6, 1944, Serial No. 557,480

1 Claim. (Cl. 193—21)

This invention relates generally to grain elevators, and more especially to a distributing spout for grain elevators.

One object of my invention is to provide the lower end of the distributing spout with a novel hinged cut-off spout, whereby the flow of the grain may be completely shut off before the distributing spout and cut-off spout are moved from one duct to another, thereby preventing waste of grain and the mixture of grain in the bins of the grain elevator to which the various ducts lead.

A further object of my invention is to provide a novel sprocket chain and track arrangement, whereby the distributing spout and cut-off spout may be easily and readily moved from one duct to another, without climbing up to the top of the ducts and cleaning off spilled grain which would prevent the backward and forward movement of the spout.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a side elevation, illustrating the application of my invention.

Figure 2 is a plan view, partly in section.

Figure 3 is an enlarged detail longitudinal section, taken on line 3—3 of Figure 2.

Figure 4 is an enlarged detail sectional view of the lower end of the spout and associated parts.

Figure 5 is an enlarged vertical transverse section, taken on line 5—5 of Figure 3, and Figure 6 is a detail fragmentary sectional view of one of the sprocket wheels and tracks.

Referring to the drawings for a more particular description of my invention, and in which drawings like parts are designated by like reference characters throughout the several views, A designates the distributing spout, B the cut-off spout and C the ducts leading to the various bins of the grain elevator.

In carrying out my invention, the cut-off spout B is hinged to the transverse shaft 1, and is provided at its lower end with the discharge nozzle 2, adapted to extend into the upper end of any one of the ducts C. In carrying out my invention, the hinged cut-off spout B is formed with an inclined side wall 4, which is normally out of contact with the lower end of the distributing spout A, but may be moved directly over and across the latter when swung into elevated position by means of the lever 5, as illustrated in Figure 4 of the drawings.

The lever 5 is manually actuated by means of the cable 6 and the hand lever 7. As shown, the cable 6 is attached at one end to the upper end of the lever 5, and passes forwardly over the pulley 8, journaled to the horizontal shaft 9 carried by the bracket 10, then downwardly over the pulley 11, journaled to the outer end of the hand lever 7 and thence forwardly over the drum 3.

The shaft 1 is provided at opposite ends with the sprocket wheels 12, which run on the horizontal parallel tracks 13, mounted on the frame or platform 14. The cut-off spout B and distributing spout A are moved forward and backward along the sprocket wheel or peg tracks 13, in distributing the grain to the several bins of the grain elevator, by means of the cable 15 and drum 16, keyed to the transverse shaft 1. As shown, one end, as 17, of this cable passes rearwardly over the small pulley 18, journaled to a bracket 19, fastened to the adjacent end of the platform 14, and said cable then extends forwardly along the platform beyond the opposite end of the track, and after passing over the pulley 20, drum 21 and pulley 22, extends in a reverse direction back to the drum 16. The ratio between the drums 16 and 21 is preferably three to one, although this ratio may be varied, if desired.

In practice, when a bin is filled with grain, the operator may first completely shut off the flow of grain through the distributing spout, by pushing downwardly on the hand lever 7, which is connected to the lever 5 by the cable 6. The hopper and distributing spout may then be moved in either direction along the track to fill the next bin desired, merely by turning the crank 23 of the drum 21.

The use of my invention will prevent the waste of grain and the mixture of grain in the bins of the grain elevator to which the several ducts lead. Other distributers do not have a shut-off for the hopper and when a bin fills up and the grain backs up in the spout, this grain spills in the first duct it crosses in moving the hopper to another duct. Thus, if you are elevating wheat and the next bin contains barley, the result is a mixture of the two, which is to be avoided. Further, with my novel sprocket wheel and track arrangement, any spilled grain would not interfere with the free movement of the cut-off spout and distributing spout, since this spilled grain will go through the tracks.

From the foregoing description taken in connection with the drawings, it is thought that the construction, operation and advantages of my invention will be readily understood, without requiring a more extended explanation.

Various changes in the form, proportions and minor details of construction may be resorted to without departing from the principle or sacrificing any of the advantages of my invention, as defined in the appended claim.

Having described my invention, what I claim as new and desire to secured by Letters Patent is:

In a device of the character specified, a distributing spout, a transverse shaft, a cut-off spout hinged to said shaft and adapted to completely shut off the flow of grain through the lower end of the distributing spout when in raised position, manually operated means for raising said cut-off spout, peg tracks mounted on a suitable horizontal frame or support, sprocket wheels mounted on the ends of the transverse shaft and running on said tracks, and manually operated means for moving or shifting the distributing spout and cut-off spout back and forth along the tracks.

HORACE D. PERKINS.

REFERENCES CITED

The following references are of record in the file of this patent:

UNITED STATES PATENTS

| Number | Name | Date |
| --- | --- | --- |
| 1,903,633 | Peebles | Apr. 11, 1933 |
| 649,703 | Moulton | May 15, 1900 |